Dec. 7, 1937. J. DICHTER 2,101,213
MACHINE FOR PRODUCING GLASS VESSELS FROM TUBING
Filed Feb. 16, 1933 2 Sheets-Sheet 1
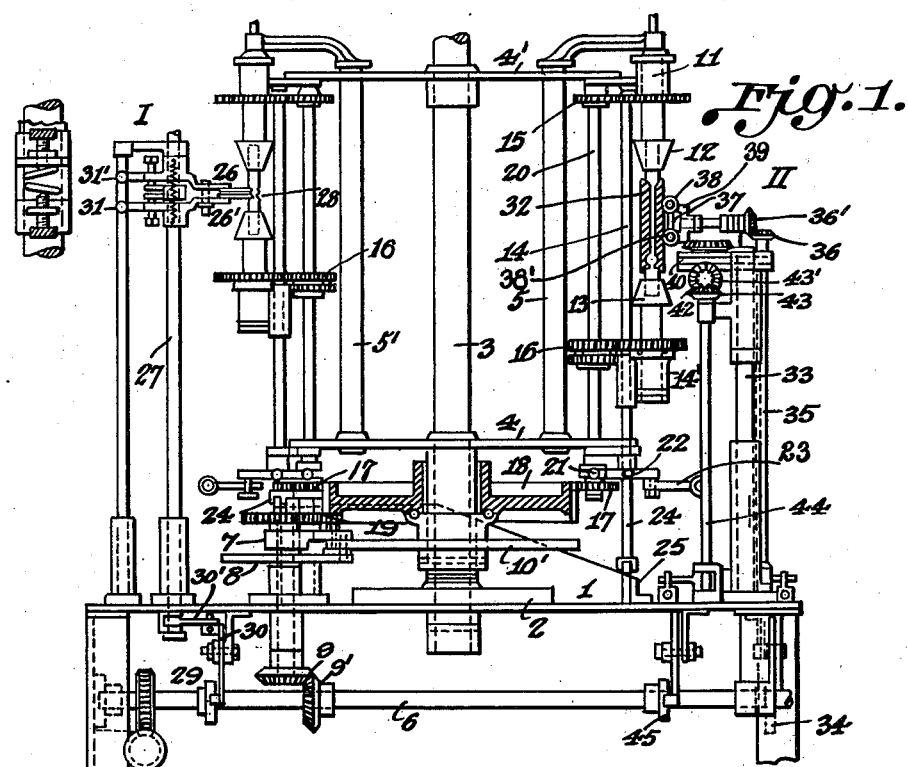

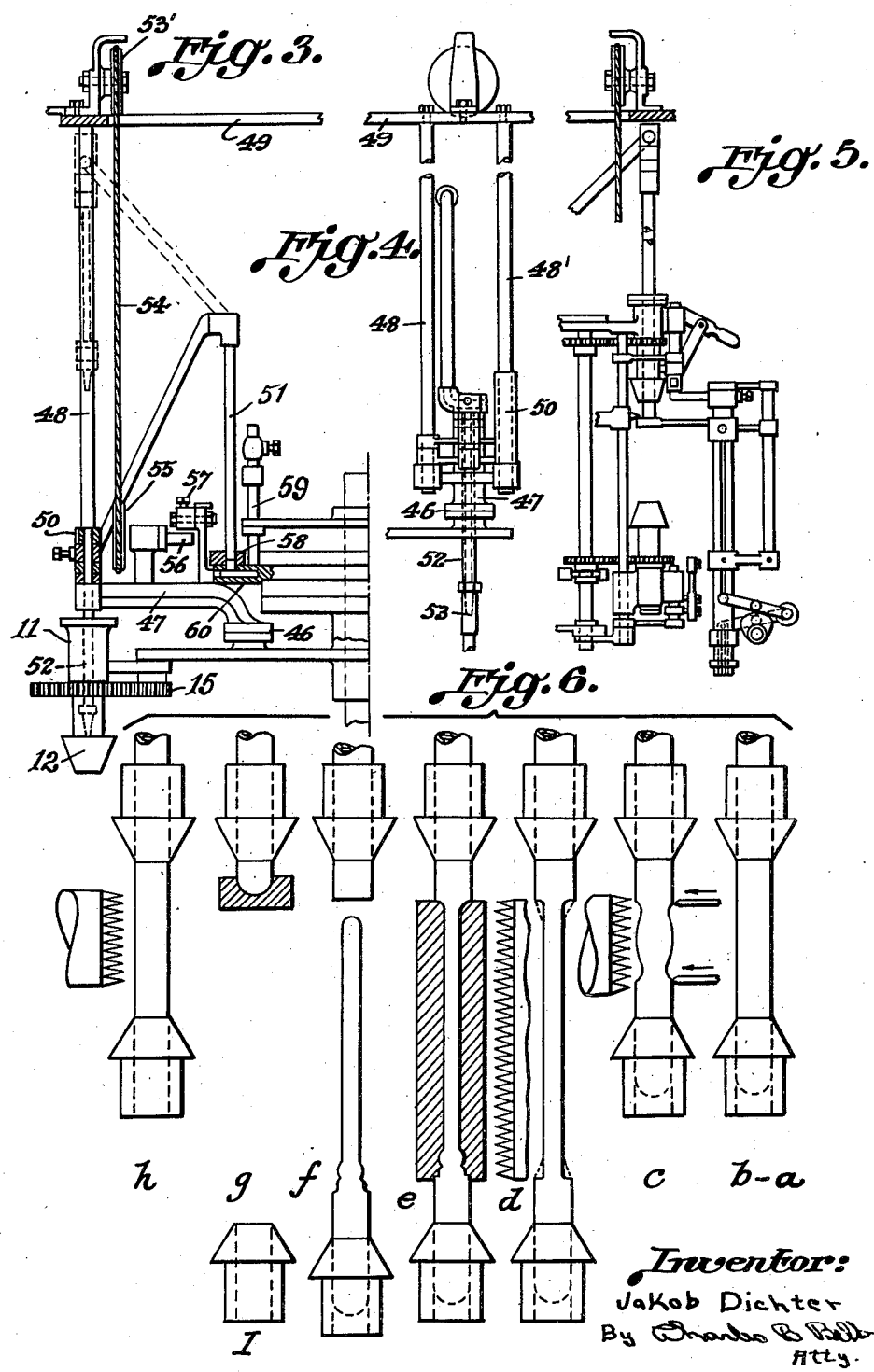

Patented Dec. 7, 1937

2,101,213

UNITED STATES PATENT OFFICE 2,101,213

MACHINE FOR PRODUCING GLASS VESSELS FROM TUBING

Jakob Dichter, Berlin, Germany

Application February 16, 1933, Serial No. 657,084
In Germany May 2, 1932

19 Claims. (Cl. 49—7)

This invention relates to machines for producing glass vessels from tubing, and more particularly to machines in which a section of tubing is heated until soft and is then blown to shape in a mold.

The shaping of the glass vessels from tubes can also be effected at the ends of said tubes, but the present invention is concerned with machines in which a length of tubing is gripped at each end, the middle portion being heated until soft and then being drawn out and blown to the required shape. When this process in its simple form is employed, great difficulty is experienced in producing a uniform product as the thickness and diameter of the tubing always vary however carefully the tubing is selected, and any faults of this kind are greatly exaggerated in the finished product.

It is an object, therefore, of the present invention to provide an improved form of machine in which this difficulty is overcome. In a machine for producing glass vessels from glass tubes in which tubes to be worked are held and rotated by oppositely disposed holding devices, and in which the shaping is effected at a point between the holding devices, according to the present invention a mold is provided at said point, the constricted part of the glass being blown out until it contacts with the mold, which latter is disposed between the holding devices. The machine according to the invention may be readily adapted for shaping various kinds of glass vessels, including ampoules for containing chemical and other preparations, such ampoules being provided with a constricted neck portion which is arranged to be readily and cleanly broken off for obtaining access to the contents of the ampoule.

In order to more easily provide the constricted sections in the mold, devices are provided which positively press in or remove the shoulders because these mostly extend conically during the drawing. It is immaterial whether this removal of the shoulder is effected before or after the stem is drawn.

Further a device is provided for introducing compressed air for blowing out the constriction in the mold or for providing the closed end with a spherical base. In order to be able to prepare this hemispherical base also as uniformly as possible, a hemispherical mold is used in which the soft closed end is blown out.

Arrangements have already been disclosed in which glass tubes are clamped at both ends in holding devices and in which the molding section lies between the holding devices, but only auxiliary devices are involved and the requisite manipulations for the shaping are performed by the operator. Further, these arrangements have for their subject no method, nor have they as basis the carrying out of shapings with diameters smaller than the original tube.

The machine shown and herein described constitutes only an embodiment by way of example, and may equally well be horizontally arranged. It is also in no way limited to operation on long glass tubes only but measured tube sections can also be operated upon.

One form of machine according to the invention is illustrated in the accompanying drawings, in which:—

Figure 1 is a side elevation;

Figure 2 is a plan corresponding to Figure 1;

Figure 3 is a side elevation of the blowing device;

Figure 4 is a front elevation corresponding to Figure 3;

Figure 5 is a side elevation showing the use of the mold in blowing the round base;

Figure 6 shows diagrammatically the sequence of operations for preparing ampoules with round bases, Figure 7 illustrates diagrammatically the processes employed in producing a screw-neck vessel, and Figure 8 is an enlarged partial view of the constricting device.

The machine shown is one having eight pairs of holding devices arranged in circular formation about a vertical central axis, said holding devices being advanced step by step and presented to the individual working stages. Obviously the same working arrangement could be stationary without the holding devices rotating about the central axis, the lower holding device in this case being merely raised and lowered by the cam ring.

In the drawings, the vertical central shaft 3 is secured in the bearing flange 2 on the base plate 1. The spaced discs 4, 4' are rigidly connected by cross-members 5, 5' so that they can be rotated about the shaft 3. The main shaft 6 derives its drive from the driving shaft, so that the feed disc 7 and locking disc 8 are rotated by the bevel gears 9, 9'. On each rotation of the shaft 6 and the discs 7 and 8, the disc 10 and the discs 4, 4' are moved through an angle of 45°. The bearings 11 for the clamping chucks 12 are secured to the disc 4'. The lower clamping chucks 13 are mounted in sliding bearings 14' which can be raised and lowered on two parallel guide bars 14 secured to the discs 4, 4'.

The clamping chucks 12, 13 derive their drive from the main shaft 6 by way of the gear wheels 15, 16, 17, 18, 19. The gear wheel 16 is displaceably arranged on the shaft 20 provided with a groove and participates in the upward and downward motion of the chuck 13. At the lower end, the shaft 20 has also a claw coupling 21 by means of which the rotation of the chuck can be interrupted. This interruption is effected in that the lever 22 releases the connection of the claw coupling 21 by way of the lever 23 which is connected with a cam by means of a linkage, so that the shaft 20 stands still.

The lower chucks 13 slide on the cam track 25 by means of bolts 24 provided with rollers at their ends, and the cam track is shaped in accordance with the drawing motion in that definite parts thereof fall or rise, or else are raised and lowered.

In Figure 1, position I, two constricting levers 26, 26' are between the chucks and execute a motion about the shaft 27 towards the already softened glass tube 28 and remove this appropriately at the shoulders. This motion is effected by the cam 29 and levers 30, 30'. The depth of constriction is controlled by the stop screws 31 and 31'.

Obviously this arrangement may be of such configuration that the heated section is constricted over its entire breadth or else that, in addition to the two shoulders, further constrictions contained in the mold are preformed.

This preforming operation may also occur after drawing the stem.

In position II, Figure 1, is arranged the mold 32 consisting of two mold jaws embracing the section to be shaped. This mold is arranged on the shaft 33 for vertical adjustment. The opening and closing of the mold jaws is effected by way of the cams 34, the linkage 35, the bevel gears 36, 36', the gear wheel 37 which moves the two toothed rods 38, 38', to which the mold jaws are secured, in opposite directions. The mold carrier 39 is displaceable in the slide 40 horizontally with respect to the glass tube by means of the rack bar 41, the gear wheel 42, the bevel gears 43, 43', the linkage 44 and cam 45.

As shown in Figures 3 and 4 a lower carrying ring 46 to which eight part bearings 47 are secured, is provided on the upper disc. In these bearings are supported guide bars 48, 48' which at the upper end are connected with the ring 49. The blast head carrier 50, the upper end of which is connected by a rubber hose to the air supply pipe 51 and the lower end of which is equipped with a blast pipe 52 which turns in the blast head carrier 50, slides on the guide bars 48, 48'. A short length of rubber hose 53 connects the blast pipe 52 with the glass tube at the lower end of the blast pipe 52. The rotation of the glass tube during the heating is effected by the clamping chuck and the blast pipe is carried along by the glass tube during rotation.

The blast head carrier 50 is connected to a cord 54 which passes over a lower pulley 55 and an upper pulley 55'. At the lower end, the lower pulley 55 has a stub shaft 56 covered with rubber or leather which on further advance of the disc slides in contact with the pivotally mounted friction lever 57 and thereby brakes the blast head carrier in sliding down or else assists the downward motion. This downward motion of the blast head carrier is effected when for a new working period the glass tube is fed a definite length.

The air pipe 51 is connected with an upper valve plate 58 distributing to all blast heads the air which passes through the supply pipe 59, equipped with a control valve, and over the lower valve plate 60. In addition, the instant of blowing in air is determined by this arrangement.

The mode of operation of the machine for manufacturing ampoules with stem, constriction and round base will now be described with reference to Figure 6 a—h for one working unit.

The glass tube is held by the clamping chucks 12, 13 and heated by the burner at the part intended for the stem. For this purpose a plurality of working positions a—b can be provided. Thereafter the two shoulders are preformed or pressed in the position c to ensure a more easy introduction into the mold. This removal of the shoulders can also be effected after the drawing-out. After adequate softening of the glass tube the lower clamping chuck executes a downward motion of definite length and draws a stem as shown in the position d. The mold in which the stem is blown can now be positioned over the constricted part directly after completion of the drawing operation or simultaneously therewith, or else only after further heating as shown in position e. On closing the mold jaws they may also, if necessary, simultaneously operate on the shoulder so that a crushing of the glass wall is avoided. In the case of glass which freezes quickly, a further heating of the constricted point is desirable.

After the mold has been closed, the air valve of the blast device is opened and the stem blown out until it is applied against the wall of the mold. In accordance with the configuration of the mold, the glass tube may be kept rotating during blowing or else rotation may be interrupted by means of the clutch provided for this purpose. A mark for the point at which the ampoule is subsequently to be opened is included in the mold, and is molded simultaneously for instance in the form of a widened or constricted portion.

A point of separation intended for the opening may however be effected after the blowing e. g. by pressing in a small depression by means of a device such as shown in Figure 1. It is advantageous, after the heating which preferably precedes the pressing operation, to blow air from the outside against the depressed portion simultaneously with the molding of the depression or directly thereafter, because in this way the surface of the glass is hardened at this point which favours the ready breaking-off of the stem without splintering.

In the working position f the upper end of the stem is separated from the glass tube and the glass tube is simultaneously closed in that a burner heats the glass at the point of separation and the lower chucks move downwardly. While the complete ampoule in the lower chuck slides into a collecting container, a hemi-spherical mold is brought to bear against the closed end of the tube in the working position g and the base is blown out by blowing in air which is supplied in the same manner as in position e.

If glass vessels with flat bottoms are to be produced then the blowing in of air is omitted and the base is merely refused.

Obviously the round bottom may be produced without the use of a mold.

After blowing the bottom in the mold the glass tube is advanced by a corresponding length and the working process recommences.

On the advance of the glass tube the base mold, which in the case of a flat bottom may consist merely of a flat plate, descends by the length of the feed stroke whereby a smooth sliding forward of the glass tube is attained, on which bears the weight of the blast device connected with the upper end of the tube.

Obviously two points of a tube may be heated and molded simultaneously and the stem produced may be fused off in the middle instead of at the end.

The glass body may be cut off in the molding position and the cut end sealed during the blowing-in of air.

The tube may also be closed at the upper end and air blown in from the lower open end.

While the mode of operation of the present machine has been shown primarily in its application to glass vessels in which a portion of the tube is constricted, it may of course, also be used for shaping glass vessels of larger diameter than the original tube.

Equally one end of the tube only may be previously constricted for introduction into the mold and solely this constricted section blown out in a mold, e. g. if the separation of the ampoule body occurs beneath the lower clamping chuck instead of beneath the upper clamping chuck as shown in Figure 6 *f*.

I wish it to be understood that I do not desire to be limited to the exact details of construction shown and described for obvious modifications will occur to a person skilled in the art.

What I claim is:—

1. A machine for producing glass vessels from glass tubes comprising in combination, pairs of axially superposed tube holders arranged in a circle, means for rotating said holders about their axes, means for moving said pairs of holders about their common centre, concentrically distributed means for heating the glass tubes between the holders of each pair, means for forming spaced constrictions in each tube between the holders and means for blowing out and for molding each tube between the constrictions thereof.

2. A machine for producing glass vessels from glass tubes comprising in combination, pairs of axially superposed tube holders arranged in a circle, means for rotating said holders about their axes, means for moving said pairs of holders about their common centre, concentrically distributed means for heating the glass tubes between the holders of each pair and means for constricting, for blowing out and for molding the heated part of a tube between the holders.

3. A machine for producing glass vessels from glass tubes comprising in combination, pairs of axially superposed tube holders arranged in a circle, means for rotating said holders about their axes, means for moving said pairs of holders about their common centre, concentrically distributed means for heating the glass tubes between the holders of each pair, means for blowing out and for molding the heated part of a tube between the holders, a blowing head in line with a pair of holders, means for varying the vertical position of said blower head and automatically active means for braking the vertical movement of said head.

4. In a machine for producing glass vessels from glass tubes, means for holding a glass tube, means for heating the glass tube intermediate its ends, means for forming a pair of constrictions in the heated portion of the glass tube, said constrictions being spaced apart longitudinally of the glass tube, and means for reducing the cross sectional area of the glass tube between the said constrictions.

5. In a machine for producing glass vessels from glass tubes, a pair of axially aligned holding devices for a glass tube, means for heating the tube between the holding devices, means for forming a pair of constrictions in the tube between the holding devices, said constrictions being spaced apart longitudinally of the tube, and means for moving said holding devices relative to each other to reduce the cross sectional area of the tube between the constrictions.

6. In a machine for producing glass vessels from glass tubes, means for heating a glass tube intermediate its ends, a pair of tools adapted for engagement with the heated portion of the tube to form a pair of constrictions in the tube, said constrictions being spaced apart longitudinally of the tube, and means for reducing the cross sectional area of the tube between the said constrictions.

7. In a machine for producing glass vessels from glass tubes, a pair of axially aligned holding devices for a glass tube, means for heating the glass tube between the holding devices, a pair of constricting levers, means for moving said constricting levers into engagement with the heated portion of the glass tube to form a pair of constrictions in the tube, said constrictions being spaced apart longitudinally of the glass tube, and means for relatively moving said holding devices away from each other to reduce the cross sectional area of the glass tube between the said constrictions.

8. In a machine for producing glass vessels from a length of glass tubing, a pair of holders adapted to hold the length of glass tubing, means providing for movement of the glass tubing through one of said holders, a blow head adapted for engagement with the free open end of the length of glass tubing, means providing for movement of the blow head with the length of glass tubing upon movement of the latter through one of the holders, and means for braking the movement of the blow head.

9. In a machine for producing glass vessels from a length of glass tubing, a pair of axially aligned superposed tube holders adapted to hold a length of glass tubing, means for heating the glass tubing between the said holders, means for blowing out and for shaping the heated part of the tube between the holders, a blowing head in line with the holders, means for varying the vertical position of the blowing head, and means for braking the vertical movement of the blowing head.

10. In a machine for producing glass vessels from a length of glass tubing, a pair of superposed axially aligned tube holders adapted to hold the length of glass tubing, means for heating the length of glass tubing between the holders, a blower head engageable with one end of the length of glass tubing for supplying air under pressure to the interior of the glass tubing to shape the heated portion thereof, means providing for movement of the length of glass tubing through the upper of the tube holders, means providing for vertical movement of the blower head upon movement of the length of glass tubing, and friction means for braking the downward movement of the blower head.

11. In a machine for producing glass vessels from glass tubes, a pair of holders adapted to hold a glass tube, means for heating the glass tube between the holders, a mold adapted to enclose the heated portion of the glass tube and means for supplying a gas under pressure to the interior of the glass tube while the heated portion thereof is enclosed by the mold to cause the heated portion of the glass tube to conform to the shape of the mold.

12. In a machine for producing glass vessels from glass tubes, a pair of holders adapted to hold a glass tube, means for heating the glass tube between the holders, means providing for movement of the holders away from each other to reduce the cross sectional area of the heated portion of the tube, a mold adapted to enclose the heated constricted portion of the glass tube, and means for supplying a gas under pressure to the interior of the glass tube to blow the heated constricted portion thereof into engagement with the mold.

13. In a machine for producing glass vessels from glass tubes, a pair of holders adapted to hold a glass tube, means for heating the glass tube between the holders, a pair of tools adapted to be moved into engagement with the heated portion of the glass tube to form a pair of constrictions therein, the constrictions being spaced apart longitudinally of the glass tube, means for reducing the cross sectional area of the glass tube between the constrictions, a mold adapted to enclose the portion of the glass tube which is reduced in cross sectional area, and means for admitting a gas under pressure to the interior of the glass tube to blow the reduced portion thereof into engagement with the mold.

14. In a machine for producing glass vessels from a length of glass tubing, a pair of holders adapted to hold the length of glass tubing, means for heating the length of glass tubing between the holders, means for shaping the heated portion of the length of glass tubing, means for severing the shaped portion of the length of glass tubing from the remainder of the length of glass tubing and for sealing the end of the length of glass tubing, a mold movable into engagement with the sealed end of the length of glass tubing, and means for shaping the sealed end of the length of glass tubing in the said mold.

15. In a machine for producing glass vessels from a length of glass tubing, a pair of holders adapted to hold the length of glass tubing, means for heating the length of glass tubing between the holders, means for blowing out and shaping the heated portion of the length of glass tubing between the holders, means for heating the length of glass tubing between the shaped portion thereof and the remainder of the length of glass tubing to sever the shaped portion of the glass tubing from the remainder thereof and to seal the end of the length of glass tubing, a mold engageable with the sealed end of the length of glass tubing, and means for admitting air under pressure to the interior of the length of glass tubing to blow the sealed end thereof into engagement with the said mold.

16. In a machine for producing glass vessels from glass tubes, means for holding a glass tube, means for heating the glass tube intermediate its ends, and means for constricting, for blowing out and for molding the heated part of the tube.

17. In a machine for producing glass vessels from glass tubes, means for holding a glass tube, means for heating the glass tube intermediate its ends, means for forming a pair of constrictions in the heated portion of the glass tube, said constrictions being spaced apart longitudinally of the glass tube, and means for shaping the glass tube between the said constrictions.

18. In a machine for producing glass vessels from glass tubes, means for holding a glass tube, means for moving said holding means along a definite path, means for heating the glass tube intermediate its ends, a pair of tools mounted for movement toward and away from the glass tube at one point in its path of movement, said tools being adapted to form spaced apart constrictions in the glass tube, and means for moving said tools into operative engagement with the glass tube when the glass tube reaches a position adjacent the said tools.

19. In a machine for producing glass vessels from glass tubes, means for holding a glass tube, means for moving said holding means along a definite path, a blow head adapted for engagement with the free open end of the glass tube at one point in the path of movement of the glass tube, and means controlled by the movement of the holding means for controlling the engagement of the blow head with the length of glass tubing.

JAKOB DICHTER.